United States Patent [19]

Montagnon et al.

[11] Patent Number: 5,037,550
[45] Date of Patent: Aug. 6, 1991

[54] BIOLOGICAL CONTACTOR FOR PURIFYING WATER TO PRODUCE DRINKING WATER AND ASSOCIATED CONTROL METHOD

[75] Inventors: Jean R. Montagnon, La Celle St. Cloud; Guy P. Bablon, Feucherolles; Gérard L. Dagois, Asnieres; Claire C. Ventresque, Colombes, all of France

[73] Assignee: Societe Pica - Produits Industriels et Charbons Actifs, Levallois Perret Cedex, France

[21] Appl. No.: 445,297

[22] Filed: Dec. 4, 1989

[30] Foreign Application Priority Data

Dec. 5, 1988 [FR] France ............................ 88 15909

[51] Int. Cl.⁵ .................................................. B01D 3/32
[52] U.S. Cl. .................................... 210/602; 210/614; 210/618; 210/631; 210/673
[58] Field of Search .............. 210/602, 614, 616–618, 210/631, 673, 694, 150

[56] References Cited

U.S. PATENT DOCUMENTS

| | | | |
|---|---|---|---|
| 3,755,157 | 8/1973 | Wisfeld et al. | 210/618 |
| 3,853,752 | 12/1974 | Tymoszczuk | 210/618 |
| 4,053,396 | 10/1977 | Trense et al. | 210/618 |
| 4,255,266 | 3/1981 | Moreaud et al. | 210/614 |
| 4,274,966 | 6/1981 | Palmer | 210/618 |
| 4,857,198 | 8/1989 | Meidl | 210/618 |

FOREIGN PATENT DOCUMENTS 2161240 6/1973 France.
7621246 10/1978 France.

*Primary Examiner*—Tom Wyse
*Attorney, Agent, or Firm*—Browdy and Neimark

[57] ABSTRACT

A biological contactor (8) comprises a granular bed including a layer (17) based on activated carbon the material of which satisfies the following conditions:
density between 0.18 and 0.32 g/cm³,
carbon tetrachloride adsorbing power between 60% and 120% by weight,
carbon tetrachloride retention less than 25% by weight of the carbon tetrachloride adsorbed mass,
methylene blue: between 5 and 30 ml,
particle size: between 0.5 and 1.5 mm effective size with a coefficient of uniformity less than 2.

A washing cycle (21, 24) (air only; air plus water; water only) of the contactor is triggered (38) when a parameter (36, 37) representative of the population of algae in said layer reaches a predetermined set point threshold.

25 Claims, 6 Drawing Sheets

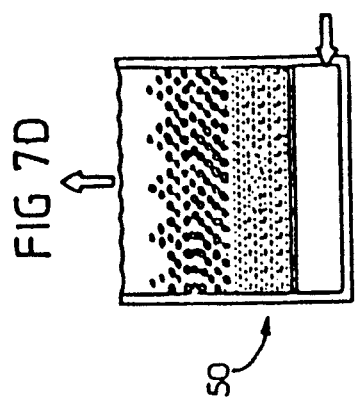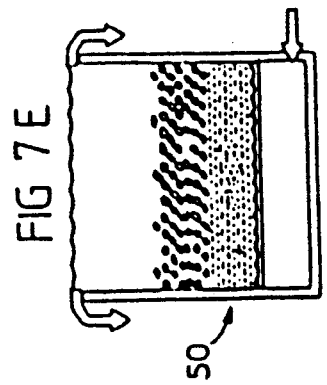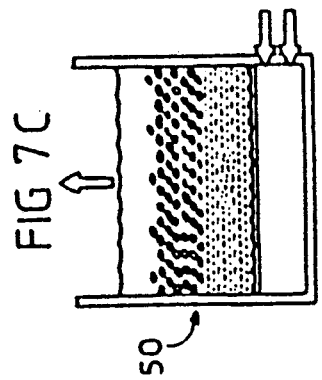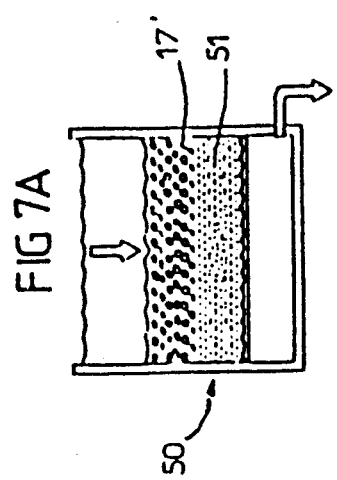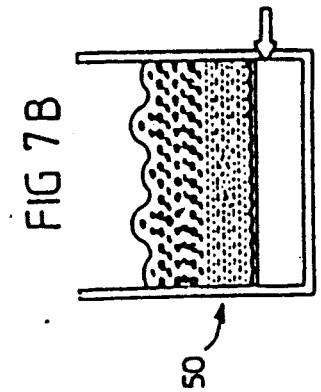

BIOLOGICAL CONTACTOR FOR PURIFYING WATER TO PRODUCE DRINKING WATER AND ASSOCIATED CONTROL METHOD

This invention concerns the method of operating a biological contactor comprising a bed of appropriately chosen active granular material (such as activated carbon) for filtering and purifying physically and biologically water containing materials in suspension and/or in solution (partially organic). It is principally relevant to the production of drinking water.

As is well known, the production of drinking water entails taking water from the natural environment, for example from waterways in the vicinity of urban areas, and subjecting it to various treatments to clarify and purify it so as to meet various conditions or standards of a physical, organoleptic, chemical and bacteriological kind.

To achieve this objective at all times it is desirable to produce at the outlet from the treatment station water which is of higher quality than the standards require in order to provide a safety margin, all the more so in that the quality of the water is likely to deteriorate in the distribution network.

A conventional process for producing drinking water from water taken from the natural environment comprises, for example:
  screening which separates out the coarse impurities conveyed by the water to be clarified;
  pretreatent by introducing reagents followed by flocculation and settling so as to eliminate materials in suspension;
  sand filtering during which ammonia is biologically nitrified and impurities in suspension are eliminated;
  injection of ozone (ozonation) to kill bacteria and viruses;
  filtering by granular activated carbon to eliminate organic materials;
  chlorination.

Known filtration by activated carbon in a process of this kind corresponds to adsorption of impurities on the surface and into the porosity of the activated carbon: this entails periodic regeneration of the saturated activated carbon by thermal or chemical means.

It has recently been proposed to use activated carbon in the production of water to further procure biological degradation of biodegradable organic materials by having them consumed by bacteria maintained in an aerobic medium in the granular activated carbon bed. This represents an attempt to have the activated carbon fulfil an additional function, namely a biological support function.

Such biological use of activated carbon is still in its infancy and there is currently a tendency to define operating conditions for a biological bed of this kind only by analogy, where this is possible, with those used for conventional filter beds (those using sand, for example).

This applies in particular to the washing methods employed.

The retention by a sand filter bed of materials in suspension in the feed water results in-clogging of the interstices between the grains which increases the head loss of the water through the filter bed: it is therefore necessary to clean the sand periodically. To do this it is known to circulate in the sand an upward flow of air or water in order to detach the impurities and then, by rinsing, to remove these impurities over an overflow. It has even been proposed in some cases to inject air and water simultaneously.

The application of a washing procedure of this kind to a bed comprising grains of activated carbon entailing simultaneous injection of air and water is generally regarded as undesirable because of the attrition (wear) of the grains that results, which causes rapid wearing down of the activated carbon grains and substantial losses thereof by entrainment over the overflow. It is therefore generally accepted that activated carbon does not lend itself to washing including any such mixed (air plus water) injection phase and that optimising the operating conditions of a biological activated carbon bed would necessarily exclude any such mixed (air plus water) injection phase in favour of injection of air only and/or injection of water. This received wisdom of those skilled in the art is expressed in particular in ACTIVATED CARBON ADSORPTION* of Organics from the Aqueous Phase—Volume 2—by Michael J McGUIRE and Irwin H SUFFET, published by ANN ARBOR SCIENCE (1980).

The invention is specifically directed to optimising these operating conditions in biological mode, which has made it necessary to define conditions that must be satisfied by:
  a granular material constituting the biological bed (usually, but not necessarily, based on activated carbon) to constitute a "sound" biological support adapted to favour the necessary growth of populations of bacteria;
  the frequency with which the biological bed is washed;
  the steps of the counter-current washing sequence.

The function of a biological bed of this kind is not only to filter but also and more importantly to bring a bacteria population into contact with the organic substrate contained in the water; also, washing a biological bed of this kind does not have the same objective as washing a conventional filter bed, and the two washing operations correspond to different physical realities; it is for this reason that it seems more appropriate to refer to "biological contactors" rather than "filters".

The invention is based on the surprising discovery that it was possible to find an active granular material such as activated carbon or a material based on activated carbon which achieves a compromise between requirements that at first sight appear incompatible: to be suitable for use as a biological support for a bacteria population, while being suitable for washing so as to detach and remove unwanted materials and organisms with a low air and/or water linear speed (which is of benefit from the energy point of view and from the attrition point of view).

As well as specifying a material of this kind, the invention proposes an effective washing method which does not result in any unwanted wear of the granular material.

It also proposes a parameter instrinsic to the biological contactor which can be used to command judiciously triggering of the washing cycles in spite of fluctuations in the environment and in particular in the ambient temperature.

To this end the invention proposes a purification biological contactor for producing drinking water including a tank containing a granular bed and comprising a bottom on top of which is a filter bottom and a side wall with an upper edge forming an overflow lip, a device for supplying water to be treated to the upper part of the tank, a device for removing treated water from beneath the bottom of the tank, a device for injecting washing water and a device for injecting washing air under the filter bottom, characterised in that the granular bed comprises a layer based on activated carbon the material constituting which meets the following conditions:

density between 0.18 and 0.32 g/cm$^3$,
carbon tetrachloride adsorbing power between 60% and 120% by weight,
carbon tetrachloride retention less than 25% by weight of the carbon tetrachloride adsorbed mass,
methylene blue: between 5 and 30 ml,
particle size: between 0.5 and 1.5 mm effective size with a coefficient of uniformity less than 2;

the tank being further provided with a device for monitoring in time a parameter representative of the population of algae in said layer associated with a triggering device receiving measuring signals from the monitoring device and connected to the water and air injection devices so as to trigger a washing cycle (air only; air plus water; air only) when the representative parameter reaches a predetermined set point threshold.

According to preferred features of the invention, some of which may be combined:

MATERIAL the material constituting the granular layer meets the following conditions:
density between 0.18 and 0.26 g/cm$^3$,
carbon tetrachloride adsorbing power between 70% and 120%,
carbon tetrachloride retention between 15% and 25% by weight of the carbon tetrachloride adsorbed mass,
methylene blue: between 18 and 30 ml;

this material preferably satisfies the following conditions:
density between 0.19 and 0.24 g/cm$^3$,
carbon tetrachloride adsorbing power between 80% and 110%,
carbon tetrachloride retention between 15% and 20% by weight of the carbon tetrachloride adsorbed mass,
methylene blue: between 20 and 30 ml;

virtually all of said granular bed is made up of said layer of granular material which has an effective size between 0.5 and 1 mm;

this material has an effective size between 0.5 and 0.8 mm with a coefficient of uniformity less than 1.9;

this material is chosen with an effective size between 0.6 and 0.8 mm with a coefficient of uniformity less than 1.8;

said granular bed comprises a layer of sand under said layer of active granular material which is chosen with an effective size between 1 and 1.5 mm with a coefficient of uniformity less than 1.6 and the effective size of the sand is between 0.5 and the effective size of the active material, preferably between 0.5 and 1 mm;

this granular material has an effective size between 1 and 1.4 mm with a coefficient of uniformity less than 1.5;

this granular material has an effective size between 1.1 and 1.3 mm with a coefficient of uniformity less than 1.4;

the material is activated carbon;

ALGAE POPULATION the device for monitoring the population of algae in said layer comprises pressure sensors situated at two measuring levels in an upper part of said layer and adapted to measure the head loss of the water passing between said two levels;

these sensors are respectively located approximately at the water/bed interface and at a depth between 10 and 30 cm;

BOTTOM the bottom of the tank comprises nozzles the head of which comprises vertical slits 0.4 mm wide.

The invention also proposes a method of controlling a biological contactor comprising a granular bed comprising a layer based on activated carbon adapted to provide purification in the production of drinking water, in which method:

the material constituting the granular layer is chosen to meet the following conditions:
density between 0.18 and 0.32 g/cm$^3$,
carbon tetrachloride adsorbing power between 60% and 120% by weight,
carbon tetrachluoride retention less than 25% by weight of the carbon tetrachluoride adsorbed mass,
methylene blue: between 5 and 30 ml,
particle size: between 0.5 and 1.5 mm effective size with a coefficient of uniformity less than 2;

the water to be treated is caused to flow downwards at a linear speed less than 45 m/h so as to achieve an empty bed contact time (water in contact with the bed) of at least five minutes;

a parameter representative of the population of algae in the bed is monitored;

a washing cycle is triggered when this parameter reaches a predetermined set point threshold, which cycle comprises the following steps after interruption of the supply of water to be treated:

lowering the water level to at most the top of the granular bed,
injecting air in a counterflow arrangement at an apparent speed of less than 80 Nm$^3$/h.m$^2$ at least until bubbles appear at the surface,
injecting additional water with an apparent speed of 15 through 50 m/h until the water surface rises to an overflow level in the contactor, injection of air being continued for at least 30 seconds but interrupted before the water level reaches the overflow level,
rinsing with water in overflow mode for 5 through 20 minutes with a water speed between 8 and 50 m/h;
counterflow injection of water is halted and the contactor is again supplied with water to be treated.

According to other preferred features of this method in accordance with the invention, some of which may be combined:

virtually all of the bed being constituted by said layer, after each washing cycle the water leaving the contactor is drained off for a predetermined duration;

this predetermined duration is greater than 20 minutes;

the parameter representative of the population of algae in the bed is the head loss measured through at least an upper part of the granular layer between two measuring levels under the top surface of said layer;

the head loss is measured between approximately the top of the granular layer and a level at a depth between 10 and 30 cm;

the predetermined set point threshold corresponds to a head loss of 5 to 20 cm per 10 cm depth of layer between said measuring levels;

the air injection speed is constant before and after the additional injection of water;

the apparent air injection speed is between 10 and 40 $Nm^3/h.m^2$;

this apparent speed is between approximately 20 and 30 $Nm^3/h.m^2$;

this apparent injection speed is approximately equal to 20 $Nm^3/h.m^2$;

the injection of air only is continued for between one and four minutes;

the water injection speed is between 5 and 10 m/h;

the water injection speed is between approximately 8 and 9 m/h;

the injection of air is interrupted for at most 90% of the duration in which the water level rises.

Objects, characteristics and advantages of the invention emerge from the following description given by way of non-limiting example with reference to the appended drawings in which:

FIGS. 7A through 7E are schematic views corresponding to five successive phases of a washing cycle for the biological contactor from FIG. 6.

FIG. 1 shows in a highly schematic way the principal processing steps applied in succession to water taken from the natural environment to render it drinkable.

Figure 1:
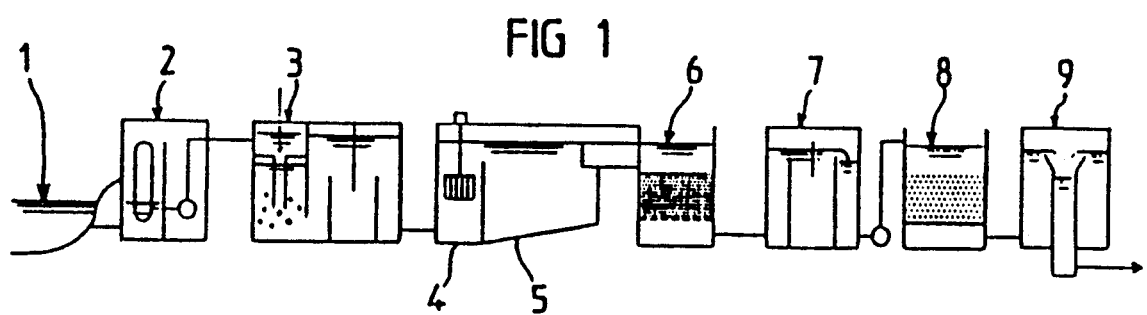
FIG. 1 is a block schematic of an installation for producing drinking water comprising a biological contactor on the output side of a sand filter.

The first step (2) is one of physical separation whereby the water, in this instance taken from a river 1, is cleared of large objects entrained by it.

The second step (3) is to inject various preliminary treatment substances. In practice, ozone is injected (at the rate of 0.8 $g/m^3$, for example) and contributes to clarification of the water while eliminating viruses. There are also injecting a flocculating agent (aluminium polychloride, for example), a coagulating agent and possibly powdered carbon to reduce the pollution of the water.

The water is then passed through a physical-chemical treatment stage comprising a coagulation-flocculation tank 4 and then a settling tank 5.

The water from the settling tank is then passed through a sand filter tank 6 to eliminate materials in suspension.

These materials comprise river sand, for example, and the apparent speed of filtration for downward flow is around 6 m/h, for example. The tank 6 is fitted with mechanised equipment (not shown) for washing the sand in a counterflow arrangement (using air and water flowing upwards).

Ozone is then injected into the filtered water (7) which then flows downwards through a biological contactor 8.

Figure 2:
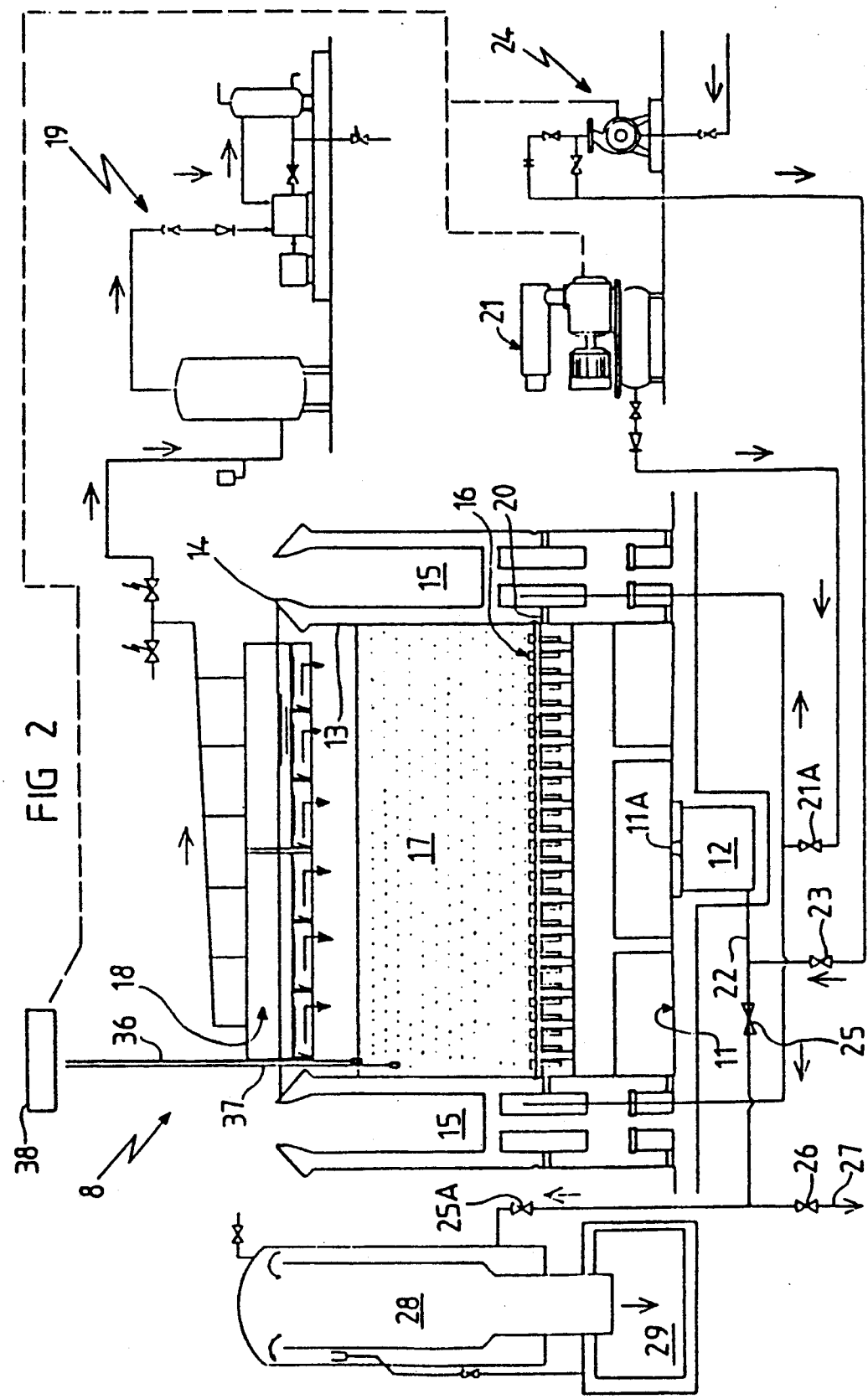
FIG. 2 is a view in vertical transverse cross-section of the biological contactor from the FIG. 1 installation.

On leaving the biological contactor the water is advantageously passed through a flowrate regulator shown in FIG. 2 and is then chlorinated (9). It is then fit to be fed into a drinking water distribution network (not shown).

As is clear from FIG. 2, the biological contactor 8 comprises a tank 10 (also called a pool)*which has a bottom 11 communicating by means of orifices 11A with a filtered water offtake channel 12 (in this instance this is underneath the tank 10), and walls 13 in the upper part of which are overflow lips 14 along which are provided offtake channels 15. In practice a number of adjacent tanks are provided, separated by these channels.

Above the bottom 11 of the tank 10 is a filter bottom 16 above which is a layer 17 of active granular material, that is to say material adapted to provide a biological medium for populations of bacteria. As there is only one such layer in this instance the contactor 8 is of the "monolayer" kind. This layer has a thickness between 1 and 3.5 m, preferably between 1.5 and 3.5 m and advantageously near 2.5 m.

Above the layer 17 are siphons 18 through which filtered and ozonated water enters. In this instance the siphons are above the level of the lips 14 of the walls of the tank 10; they are supplied by an expanded air production centre 19.

Just below the filter bottom 16 are orifices 20 in the tank walls for injecting compressed air supplied by a compressor 21 through a valve 21A.

From the filtered water channel runs a pipe 22 which communicates via a valve 23 (normally closed outside washing cycles) with a washing water centre 24, via valves 25 and 25A (normally closed during washing cycles) with the remainder of the installation for treating the water to be treated and via a valve 26 (open only just after the washing cycles) with a drain pipe 27.

The filtered water leaving the channel 12 via the valve 25 passes through a siphoid type flowrate regulator 28 slaved to a vacuum system (not shown) at the base of which is provided a filtered water tunnel 29 communicating via a line that is not shown with the chlorination area 9 from FIG. 1.

Figure 3:
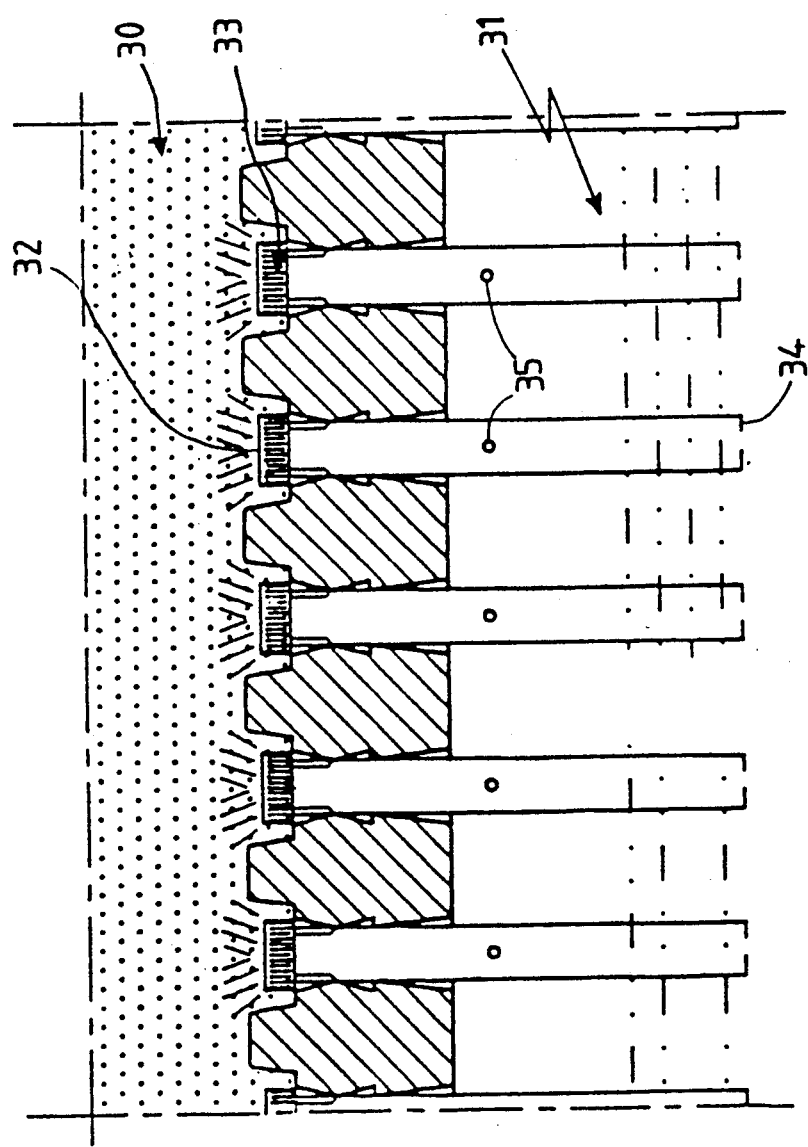
FIG. 3 is a partial view of it in longitudinal cross-section showing the filter bottom of the biological contactor.

As shown in detail in FIG. 3 the filter bottom 16 is formed by a single non-porous slab plane 30 through which pass injection nozzles 31. The latter comprise heads 32 of larger cross-section than the nozzles themselves; in this embodiment they are cylindrical and their side wall is provided with very narrow longitudinal (vertical) slits 33 (0.4 mm wide given the granular material selected for use in accordance with the invention).

For example, the nozzle heads have an outside diameter of 50 mm and a height of 25 mm and the slits are 19 mm long.

The nozzles are open at the bottom (34) to allow water to rise up them and their wall comprises at least one radial air distribution bore 35 through which passes air injected by the perforated pipes 20 from FIG. 2. In the FIG. 3 configuration air and water are therefore injected simultaneously.

The active granular material constituting the bed 17 of the monolayer contactor 8 (preferably granulated active carbon) is chosen to meet the following requirements:

density: 0.8 through 0.32 g/cm$^3$ (as per standard SL II-1 of February 1976 or ASTM D 2866), preferably 0.18 through 0.26 g/cm$^3$ or advantageously 0.19 through 0.24 g/cm$^3$.

carbon tetrachloride (CCl$_4$) absorbent power: 60 through 120% by weight (as per standard SL IX of May 1976 or ASTM D 2467), preferably 70 through 120% or advantageously 80 through 110%.

carbon tetrachloride retention: less than 25% by weight of the CCl$_4$ adsorbed mass (as per standard SL IX of May 1976 or ASTM D 3467), preferably between 15 and 25% or advantageously between 15 and 20%.

methylene blue: 15 through 30 ml (as per standard DAB VI), preferably 18 through 30 ml or advantageously 20 through 30 ml.

particle size (as per standard SL III-1 of February 1976 or ASTM D 2862):

effective size (AFNOR standard) 0.5 through 1 mm, preferably 0.5 through 0.8 mm or advantageously 0.6 through 0.8 mm, uniformity coefficient (AFNOR standard): less than 2, preferably less than 1.9 or advantageously less than 1.8.

This material is, for example, a granular activated carbon marketed by the company PICA under the reference PICABIOL G 88-1.

Note that active granular materials meeting the aforementioned conditions, particularly in the case of granular activated carbon, have the property of being washable with no attrition (despite the significant agitation cycle that they imply, the washing cycles lead to only a slow production in particle size with relatively little reduction of fine particles likely to soil and/or clog the filter and its filter bottom and to be entrained with the filtered water): this favours durability (procuring a long service life).

The aforementioned conditions may be analysed as follows:

the density of the active granular material must be suffiently low to enable effective washing in a counterflow arrangement using minimum energy;

the CCl$_4$ adsorbing power is representative of the total porosity of the material and the CCl4 retention index is representative of the fraction of finer pores (carbon with a retention index of 100% would therefore have only micropores); the fact of specifying less than 25% retention therefore amounts to specifying that a significant proportion of the pores are larger than micropores in respect of which it is considered that they do not contribute much or at all to the fixing of bacteria;

methylene blue is characteristic of the capacity of the carbon to fix molecules with relatively large dimensions; the choice of 15 through 20 ml corresponds to a high value (activated carbon as routinely used in conventional treatment of drinking water has an index around 10 );

the effective size gives the dimension of the 10% (by weight) of finest grains;

the coefficient of uniformity indicates the shape of the particle size distribution curve as it is the ratio of the size of 40% rejects to the size of 90% rejects (an index of 1 corresponds to particles of exactly the same dimension).

FIGS. 4A through 4E show the washing sequence applied to the monolayer contactor 18; this comprises the following steps, after feeding of water via the siphons 18 is terminated:

lowering the water surface (FIG. 4A) to a minimum approximately level with the top of the active granular material bed 17;

upward aeration (more precisely bubbling (FIG. 4B)) by injection of air via the pipes 19, this air coming from the compressor 21, the valve 19A being open;

upward mixed (air plus water) injection phase (FIG. 4C), the valves 19A and 23 being open and the valves 25 and 26 being closed;

raising of the water level to the overflow point (FIG. 4D), the valves 19A, 25 and 26 being closed;

additional rinsing phase with water maintaining the overflow.

Despite the received wisdom which teaches avoidance of simultaneous injection of air and water, which causes significant energetic mixing, it has been found that, as compared with injection of air or water only, the mixed (air plus water) injection phase offers improved release of materials in suspension in the water to be treated that have been separated out by the filter and an apparent improvement in overall final quality (consumption of chlorine). It therefore has a positive role to play.

In this mixed injection phase the upward flow air injection speed, less than 80 Nm$^3$/h.m$^2$, is in practice chosen between 10 and 40 Nm$^3$/h.m$^2$.

It is advantageously between approximately 20 and 30 Nm$^3$/h.m$^2$. A lower speed (10 Nm$^3$/h.m$^2$) is not always sufficient to ensure adequate unclogging of the bed 17 whereas higher speeds (40 through 50 Nm$^3$/h.m$^2$) may in some cases lead to attrition of the granular material of the bed, to strong turbidity on restarting filtering after washing and to long-lasting deterioration of the functioning of the contactors. A value of around 20 Nm$^3$/h.m$^2$ would seem to be optimal for most cases as it also results in minimum chlorine consumption by the filtered water.

The speed of injecting water at the same time as air is preferably chosen between 5 and 10 m/h, advantageously between 8 and 9 m/h and in practice around 8 m/h.

As for the duration of such mixed injection, it is found that the quantity of material in suspension is directly proportional to it below 10 minutes. This duration is chosen as being greater than 30 seconds: in practice a substantial fraction is chosen, less than 90% of the time for the water level to rise to the overflows 14. Injection of air is therefore interrupted before the water surface reaches these overflow lips, which interrupts the bubbling and reduces the risk of entrainment of grains. The time is preferably less than 4 minutes, in particular for reasons of energy consumption. In practice it is chosen between 90 seconds and 3 minutes, preferably between about 90 seconds and 3 minutes for an air injection speed of 30 Nm$^3$/h.m$^2$.

Previous injection of air only for a duration at least sufficient for bubbles to appear at the surface improves the elimination of materials in suspension separated out by the bed without increasing losses of granular material. For practical reasons this injection is advantageously carried out at the same speed as applies during the subsequent mixed injection phase, that is to say between 20 and 30 $Nm^3/h.m^2$. Its total duration depends in practice on the time it takes the compressor 21 to run up to power; the duration under constant maximal conditions is preferably less than that of the mixed injection phase and is in practice between 30 and 90 seconds, preferably between about 45 and 60 seconds.

For practical reasons the residual phase in which the water level rises to the overflow condition is carried out with the same water speed as used for the mixed injection; its duration depends on the distance that the water level has to rise to the level of the overflow lips 14 after injection of air is halted.

Subsequent rinsing under overflow conditions is preferably carried out at a speed greater than that of the mixed injection phase, chosen in practice between 8 and 50 m/h; it is preferably between 15 and 25 m/h (and advantageously equal to 16 m/h). Lower speeds can sometimes be insufficient to eliminate all materials in suspension detached from the granular material constituting the bed 17 and higher speeds can sometimes cause unnecessary loss of granular material.

The rinsing time is advantageously between 10 and 20 minutes, preferably between 10 and 12 minutes. This value would seem to suffice in some cases for eliminating materials in suspension while durations greater than 20 minutes result in an unecessary increase in the amount of previously filtered water consumed for purposes of washing.

To give an example, using the Usine Edmond PEPIN (Choisy-le-Roi) filter 55 with a PICABIOL activated carbon bed of the aforementioned type (meeting the narrowest preferred conditions) with a depth of 1.5 m and a surface area of 117 $m^2$, the washing conditions (through which the water to be filtered normally passes at a speed of 9 to 10 m/h) are defined as follows:

two minutes 30 seconds for the compressor to run up to load;
60 seconds air only at 30 $Nm^3/h.m^2$ (which therefore corresponds to a total air injection duration of 3 minutes 30 seconds);
one minute 30 seconds to two minutes of air at 30 $Nm^3/h.m^2$ and water at 8 m/h;
rinsing in overflow mode for 20 minutes at a speed of 24 m/h.

Each washing cycle leads to temporary degradation of the water produced each time filtration is restarted, in terms of the quantity of materials in suspension, the chlorine demand and the amount of leakage of microorganisms. This is because at the end of rinsing there remains in the tank of the filter a quantity of washing water which will go ahead of the filtered water when filtration is restarted.

To alleviate this disadvantage it is advisable to avoid entrainment in the downstream direction of this charge that remains trapped in the tank at the end of washing: to this end it is proposed (FIG. 4D) to drain off directly (by opening valves 25 and 26 only) the water leaving the bed 17 for the first half-hour or even the first hour (in practice usually less than two hours) after the return to filtration conditions. As an alternative to this, the charge is held back by a fine granular layer underlying the active granular material. This water can also be recycled but this is of little economic benefit.

Rather than starting washing cycles at fixed intervals, as can be done with sand filters, the invention proposes to monitor an instrinsic parameter of the biological contactor so as to command washing cycles neither too soon nor too late, in spite of fluctuations in the flowrate of the water to be treated and in the environment (in the water temperature in particular).

It has been found that it is possible to command the washing cycles on the basis of the head loss recorded under the upper surface of the active granular bed through part at least of its depth.

It should be noted that washing a biological contactor is not directed so much to eliminating materials in suspension separated out by the filter which result in physical clogging of the filter, as is the aim with a filter bed, but rather to controlling bacterial life within the bed 17: it is necessary to avoid the appearance of a population of higher life forms visible to the naked eye (nais, daphnia, molluscs, etc).

In this sense the washing of a biological contactor is not an operation of the same kind as washing a conventional filter bed, for example a sand filter bed.

Detailed analysis of the biological life in a biological contactor of this kind has shown that the change in life form is preceded by the appearance of algae responsible for localised and temporary clogging of the biological bed 17. It is therefore sufficient to monitor the appearance of this increased clogging (with the associated increased head loss) to decide judiciously when to start a washing cylce.

The aforementioned analysis has shown that in the sand-filtered and ozonated water there can exist flora principally comprising algae whereas there tend to develop on the surface of the activated carbon fauna comprising, for example, Rotifera (microorganisms) and Annelida (macrooganisms) which are present throughout the year in variable proportions and quantities. The algae constitute one foodstuff for the aforementioned macroorganisms.

These algae (synedra, for example) are in the form of long filaments which are deposited on top of the bed and impede the passage of the water.

It is therefore beneficial to monitor the algae population by any appropriate means and to command washing when this population crosses a predetermined threshold. A preferred manner of monitoring this population is to measure the associate head loss.

The benefit of this discovery is that it makes it possible to define a single parameter representative of two possible causes justifying washing (physical clogging and the prospect of the appearance of higher life forms).

The head loss is advantageously measured under the free surface of the active granular material through at least part of the depth of the filter bed (between 0.5% and 20%), in this instance using two pressure sensors 36 and 37 together constituting a system for monitoring the algae population. They transmit measurement signals to a triggering system 38 adapted to command in appropriate sequence the means 21 and 24 (a microcomputer of any appropriate type, for example).

Given the characteristics required of the active granular material the head loss threshold to trigger washing is advantageously chosen between 5 and 20 cm per 10 cm of depth.

To give an example, the head loss is measured between 0 and 10 cm depth, the sensor 37 being disposed in the water just above the bed.

Figure 8:
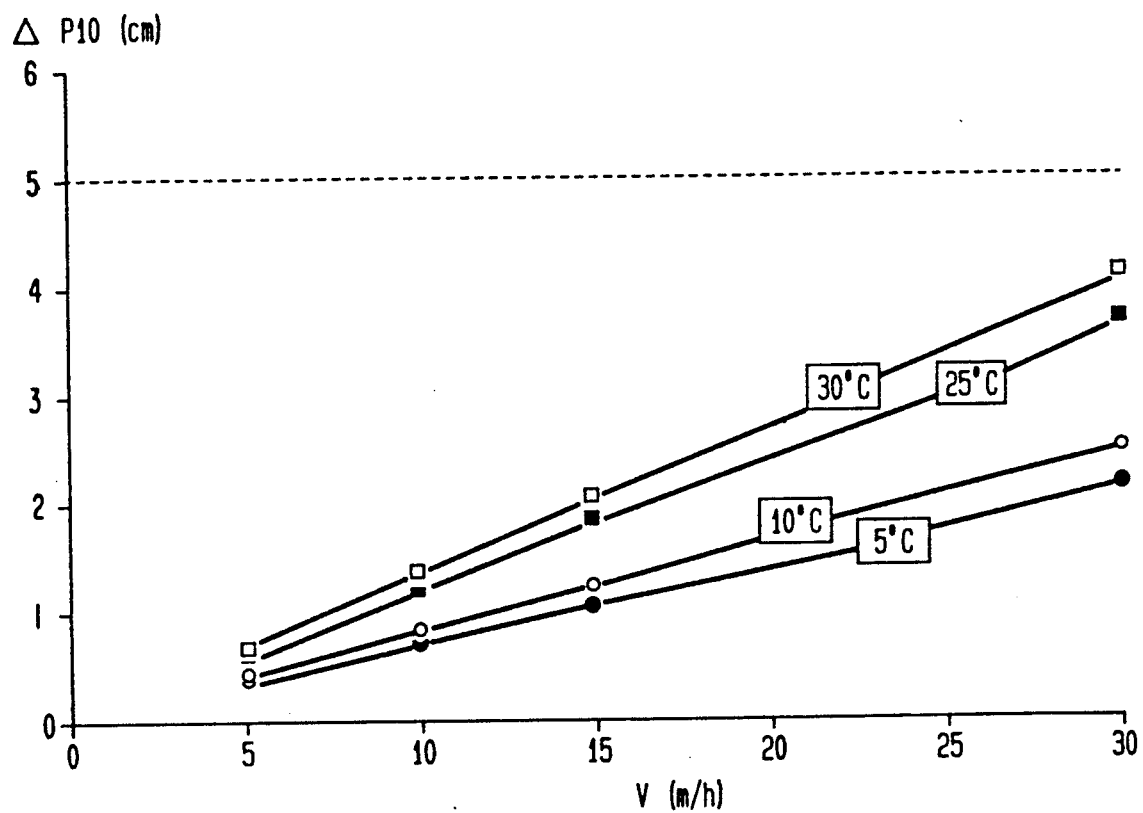
FIG. 8 is a diagram plotting, for various temperatures, the head loss through a 10 cm layer of the upper part of the bed from FIG. 2 against the speed of filtration.

FIG. 8 shows the minimum head threshold values $\Delta P$ after preliminary washing under steady state conditions and in the absence of any algae (clean material). This figure gives for various operating temperatures the head loss values ΔP for the top 10 cm layer as a function of the average filtration speed V expressed in m/h. These values correspond to a bed in which the material has an effective size of 0.9 mm and a porosity of 0.5 and they are expresed in centimeters column of water. These values are always less than 5 cm which is the justification for the arbitary threshold of 5 cm previously mentioned: it is only beyond 5 cm that clogging by algae begins.

Figure 5:
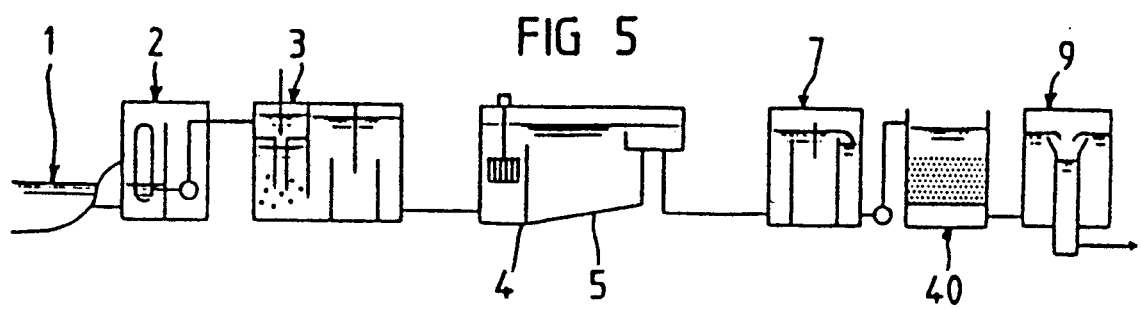
FIG. 5 is a block schematic of another installation for producing drinking water comprising a biological contactor replacing a sand filter.

FIG. 5 shows an alternative embodiment of the installation from FIG. 1 in which, all other things being equal, the sand filter is eliminated and the water from the settling tank and into which ozone has been injected is injected directly into a biological contactor 40 of the same type as the biological contactor 8 from FIGS. 1 through 3.

The washing sequence is of the same kind as in FIGS. 4A through 4E, with the same ranges of numerical values. The washing cycles are triggered in the same way as explained above.

Figure 6:
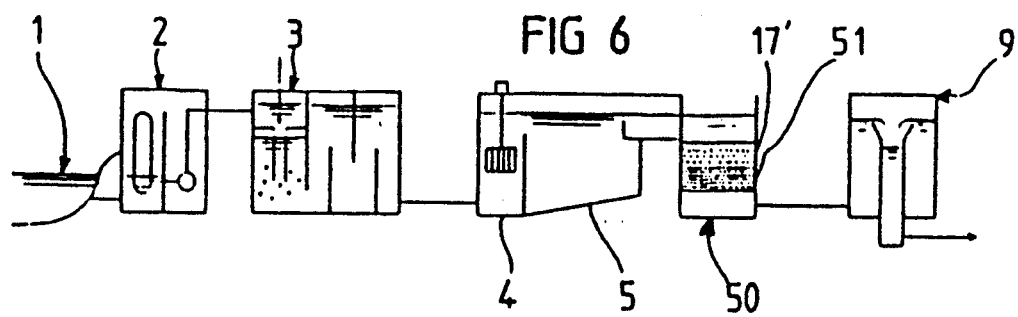
FIG. 6 is a block schematic of the filter subsystem of a further installation for producing drinking water comprising a biological contactor including a sand filter bed.

FIG. 6 shows a further embodiment of the installation from FIG. 1 in which, all other things being equal, the combination of the tanks 6 and 8 is replaced by a mixed (or two-layer) biological contactor 50 similar to the biological contactor 8 from FIGS. 1 through 3 except that a filter layer 51 has been added above the filter bottom 16 under the granular material layer 17'. This corresponds, for example, to an existing filter that has been converted into a biological contactor.

In the case of the two-layer biological contactor the active granular material chosen for the bed 17' (preferably granular activated carbon) differs from that previously described in terms of its particle size:
effective size: 1 through 1.5 mm, preferably 1 through 1.4 mm or advantageously 1.1 through 1.3 mm,
coefficient of uniformity: less than 1.6, preferably less than 1.5 or advantageously less than 1.4.

This material is, for example, a granular activated carbon marketed by the company PICA under the reference PICABIOL G 88-2.

The granular layer under this active granular material is chosen to suit the material of the layer 17' and the geometry of the filter. It has a particle size preferably between 0.5 and 2 mm (for example: effective size 0.7 mm and coefficient of uniformity 1.3).

It may be river sand, for example.

Figure 4D:
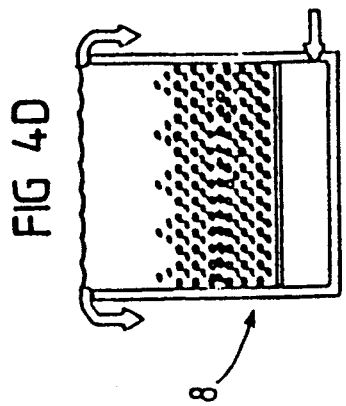
FIGS. 4A through 4E are schematic views corresponding to five successive phases of a washing cycle for the biological contactor from FIG. 2.
Figure 4E:
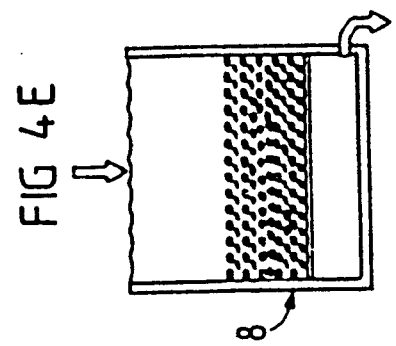
Figure 4C:
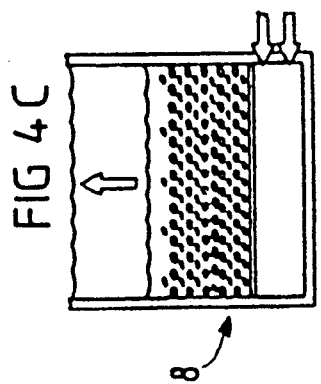
Figure 4A:
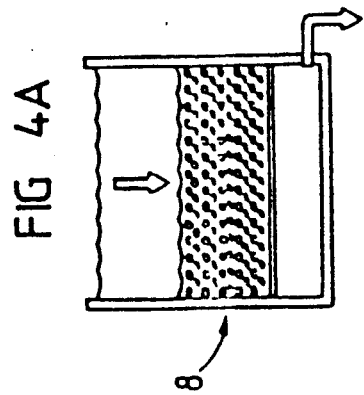
Figure 4B:
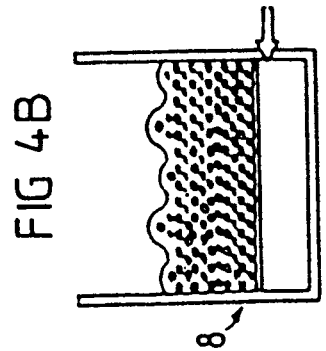

The corresponding washing sequences shown in FIGS. 7A and 7E are similar to those of FIGS. 4A through 4E, FIGS. 7D and 7E showing two consecutive phases of the step shown in FIG. 4D, namely a step in which the water level is raised (FIG. 7D) and an overflow step (FIG. 7E). The phase of draining off the first filtration water after the washing cycle itself as shown in FIG. 4E is no longer necessary in this case because the underlying layer 51 can be sufficient to retain the charge of impurities in suspension in the rinsing water remaining in the bed 17' when washing is stopped before authorising further feeding of ozonated water from the settling tank.

It is obvious that the foregoing description has been given by way of non-limiting example only and that numerous variations thereon may be put forward by those skilled in the art without departing from the scope of the invention.

Given the material chosen, the speed at which the water to be treated then passes through the contactor is in practice less than 45 m/h, preferably between 4 and 45 m/h, for example between 15 and 20 m/h.

The material can be replaced by small balls of any appropriate material coated with activated carbon.

Other parameters may be chosen to monitor the growth of the algae population: consideration may be given to measuring the concentration of chlorophyll A or the concentration of pheopigments, or to direct counting (microscope, counter, etc) or indirect counting (colour, turbidity, etc) of the algae cells.

We claim:

1. Method of controling a biological contactor (8, 40, 50) comprising a granular bed (17, 17') containing a layer based on activated carbon adapted to provide purification in the production of drinking water, in which method:
the material constituting the granular layer is chosen to meet the following conditions:
density between 0.18 and 0.32 g/cm$^3$,
carbon tetrachloride adsorbing power between 60% and 120% by weight,
carbon tetrachloride retention less than 25% by weight of the carbon tetrachloride adsorbed mass,
methylene blue: between 5 and 30 ml,
particle size: between 0.5 and 1.5 mm effective size with a coefficient of uniformity less than 2;
the water to be treated is caused to flow downwards at a linear speed less than 45 m/h so as to achieve an empty bed contact time (water in contact with the bed) of at least five minutes;
a parameter representative of the population of algae in the bed is monitored (36, 37);
a washing cycle is triggered (38) when this parameter reaches a predetermined set point threshold, which cycle comprises the following steps after interruption of the supply of water to be treated:
lowering the water level to at most the top of the granular bed,
injecting air in a counterflow arrangement at an apparent speed of less than 80 Nm$^3$/h.m$^2$ at least until bubbles appear at the surface,
injecting additional water in a counterflow arrangement with an apparent speed of 15 through 50 m/h until the water surface rises to an overflow level in the contactor, injection of air being continued for at least 30 seconds but interrupted before the water level reaches the overflow level,
rinsing with water in overflow mode for 5 through 20 minutes with a water speed between 8 and 50 m/h;
halting counterflow injection of water and the contactor is again supplied with water to be treated.

2. Method according to claim 1 wherein, virtually all of the bed consisting of said layer (17), after each washing cycle the water leaving the contactor is drained off (22, 25, 26, 27) for a predetermined duration.

3. Method according to claim 2 wherein said predetermined duration is greater than 20 minutes.

4. Method according to claim 1 wherein the parameter representative of the population of algae in the bed is the head loss measured (36, 37) through at least an upper part of the granular layer between two measurement levels under the free top surface of said layer.

5. Method according to claim 4 wherein the head loss is measured between aproximately the top of the granular layer and a level at a depth between 10 and 30 cm.

6. Method according to claim 4 wherein the predetermined set point threshold corresponds to a head loss of 5 to 20 cm per 10 cm depth of layer between said measurement levels.

7. Method according to claim 1 wherein the air injection speed is constant before and after the injection of additional water.

8. Method according to claim 7 wherein the apparent air injection speed is between 10 and 40 $Nm^3/h.m^2$.

9. Method according to claim 7 wherein injection of air is interrupted for at most 90% of the duration of raising the water level.

10. Method according to claim 1 wherein the apparent air injection speed is between 10 and 40 $Nm^3/h.m^2$.

11. Method according to claim 10 wherein said apparent speed is between approximately 20 and 30 $Nm^3/h.m^2$.

12. Method according to claim 11 wherein said apparent injection speed is, approximately equal to 20 $Nm^3/h.m^2$.

13. Method according to claim 12 wherein injection of air only is continued for between one and four minutes.

14. Method according to claim 11 wherein injection of air only is continued for between one and four minutes.

15. Method according to claim 10 wherein injection of air only is continued for between one and four minutes.

16. Method according to claim 10 wherein the counterflow injection speed of additional water is between 5 and 10 m/h.

17. Method according to claim 16 wherein injection of air is interrupted for at most 90% of the duration of raising the water level.

18. Method according to claim 10 wherein injection of air is interrupted for at most 90% of the duration of raising the water level.

19. Method according to claim 10 wherein said layer is formed of activated carbon.

20. Method according to claim 1 wherein the counterflow injection speed of additional water is between 5 and 10 m/h.

21. Method according to claim 20 wherein the counterflow injection speed of additional water is between approximately 8 and 9 m/h.

22. Method according to claim 20 wherein injection of air is interrupted for at most 90% of the duration of raising the water level.

23. Method according to claim 20 wherein said layer is formed of activated carbon.

24. Method according to claim 1 wherein injection of air is interrupted for at most 90% of the duration of raising the water level.

25. Method according to claim 1 wherein said layer is formed of activated carbon.

* * * * *